(12) United States Patent
Thomas et al.

(10) Patent No.: US 9,199,713 B2
(45) Date of Patent: Dec. 1, 2015

(54) PRESSURE PANELS

(71) Applicant: The Boeing Company, Chicago, IL (US)

(72) Inventors: Grant Brian Thomas, Lake Stevens, WA (US); Bernhard Dopker, Bellevue, WA (US); Robert Wayne Johnson, Renton, WA (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 13/936,468

(22) Filed: Jul. 8, 2013

(65) Prior Publication Data

US 2015/0008284 A1   Jan. 8, 2015

(51) Int. Cl.
*B64C 1/10* (2006.01)
*B64C 1/06* (2006.01)
*B64C 25/16* (2006.01)

(52) U.S. Cl.
CPC ... *B64C 1/06* (2013.01); *B64C 1/10* (2013.01); *B64C 25/16* (2013.01); *Y10T 428/1241* (2015.01); *Y10T 428/24* (2015.01); *Y10T 428/24628* (2015.01); *Y10T 428/24653* (2015.01); *Y10T 428/24669* (2015.01)

(58) Field of Classification Search
CPC ............. B64C 1/06; B64C 1/10; B64C 25/16
See application file for complete search history.

(56) References Cited

U.S. PATENT DOCUMENTS

| | | | |
|---|---|---|---|
| 5,165,627 A | 11/1992 | Amano et al. | |
| 6,213,428 B1 * | 4/2001 | Chaumel et al. | 244/119 |
| 7,784,736 B2 * | 8/2010 | Guering et al. | 244/119 |
| 7,988,222 B2 * | 8/2011 | Fujimoto | 296/187.04 |
| 2008/0173765 A1 * | 7/2008 | Muller et al. | 244/158.1 |
| 2009/0137196 A1 * | 5/2009 | Klug et al. | 454/71 |
| 2013/0295406 A1 * | 11/2013 | Takahashi | 428/604 |
| 2014/0203143 A1 * | 7/2014 | Durand et al. | 244/121 |

FOREIGN PATENT DOCUMENTS

WO   WO2012/081269   6/2012

OTHER PUBLICATIONS

Davis et al., Structural Efficiency Studies of Corrugated Compression Panels with Curved Caps and Beaded Webs, NASA Technical Paper 2272, Feb. 1984.
English translation of WO2012/081269 downloaded from espacenet.com on May 6, 2015.

* cited by examiner

*Primary Examiner* — Tien Dinh
*Assistant Examiner* — Richard R Green
(74) *Attorney, Agent, or Firm* — Dascenzo Intellectual Property Law, P.C.

(57) ABSTRACT

Anisotropic pressure panels are disclosed. The pressure panels include at least two distinct regions, with one region yielding to lateral deformation more than at least one other region. The regions each independently may include a plurality of beads, such beads optionally integrally formed in the body of the pressure panel. In aerospace applications, the pressure panel may be coupled to load-bearing structures, such as wings, and may at least partially define a wheel well.

18 Claims, 6 Drawing Sheets

– 1 –
PRESSURE PANELS

FIELD

The present disclosure relates to pressure panels, such as used in aerospace applications.

BACKGROUND

Aerospace vehicles, such as aircraft, are generally designed to operate in low ambient atmospheric pressure while maintaining a pressurized compartment for passengers, operators, and/or cargo. In high altitude or space operation, there may be a very high pressure differential between the pressurized compartments, held at low altitude pressure, and unpressurized compartments, at ambient pressure. Pressure panels may be used in aerospace applications to isolate and maintain different pressurized regions within an aerospace vehicle, for example a pressurized passenger compartment and an unpressurized mechanical compartment.

Aerospace vehicles also may incorporate load bearing supports which react to loads by flexing. For example, wings of aircraft in flight bear the load of the aircraft and any cargo. Where the wing of an aircraft interacts with a pressurized compartment, such as when a pressurized compartment is coupled to the wing center section within the fuselage, the structural supports and/or walls of the compartment may be subject to forces generated by the wing. Historically, pressure panels that define such boundary walls have been engineered to withstand and react to the significant forces generated by the wing, resulting in very strong walls, but walls that are heavy and that take up valuable space in the aircraft.

SUMMARY

Apparatuses according to the present disclosure may incorporate pressurized compartments at least partially defined by one or more pressure panels forming a pressure barrier. Such pressure panels are anisotropic, including at least two distinct regions that substantially span the width of the pressure panels. A first region yields to lateral deformation more than at least one other region. Pressure panels according to the present disclosure may be used in any suitable application where a pressure barrier is defined, such as aerospace applications in pressurized aircraft or spacecraft, as well in marine applications in submarines, for example.

In some embodiments, the first region includes beads that may be elongated. The beads may be arrayed and/or oriented to allow the first region to yield to lateral deformation more than longitudinal deformation. Additionally or alternatively, a second region includes beads that may be elongated. The beads may be arrayed and/or oriented to allow the second region to resist lateral deformation more than longitudinal deformation. Where the first region and the second region each include a plurality of beads, the beads of the first region and the beads of the second region may be oriented differently, optionally obliquely, substantially perpendicularly, or perpendicularly to each other. Beads may include an oblong region, optionally having a relatively uniform depth, and one or more flared ends, optionally with a depth that varies from the edge to the depth of the oblong region.

Where the pressure panel includes optional beads, such beads may be integrally formed by the body of the panel. By eliminating excess components, such pressure panels may provide for simplified assembly of aerospace vehicles and weight savings.

Pressure panels according to the present disclosure may be formed of metal, including metal alloys such as (but not limited to) one or more of aluminum alloy, magnesium alloy, and titanium alloy; and may be formed of composite structures such as (but not limited to) fiber-matrix composites incorporating one or more of carbon fiber, glass fiber, and aramid fiber.

Pressure panels of the present disclosure may be useful as a part of a pressure barrier for pressurized compartments that are coupled to load bearing components, such as wings. Illustrative, non-exclusive examples of pressure barriers that may incorporate pressure panels of the present disclosure include wheel wells.

The features, functions, and advantages that have been discussed can be achieved independently in various embodiments or may be combined in yet other embodiments, further details of which can be seen with reference to the following description and drawings.

DESCRIPTION

Figure 1:
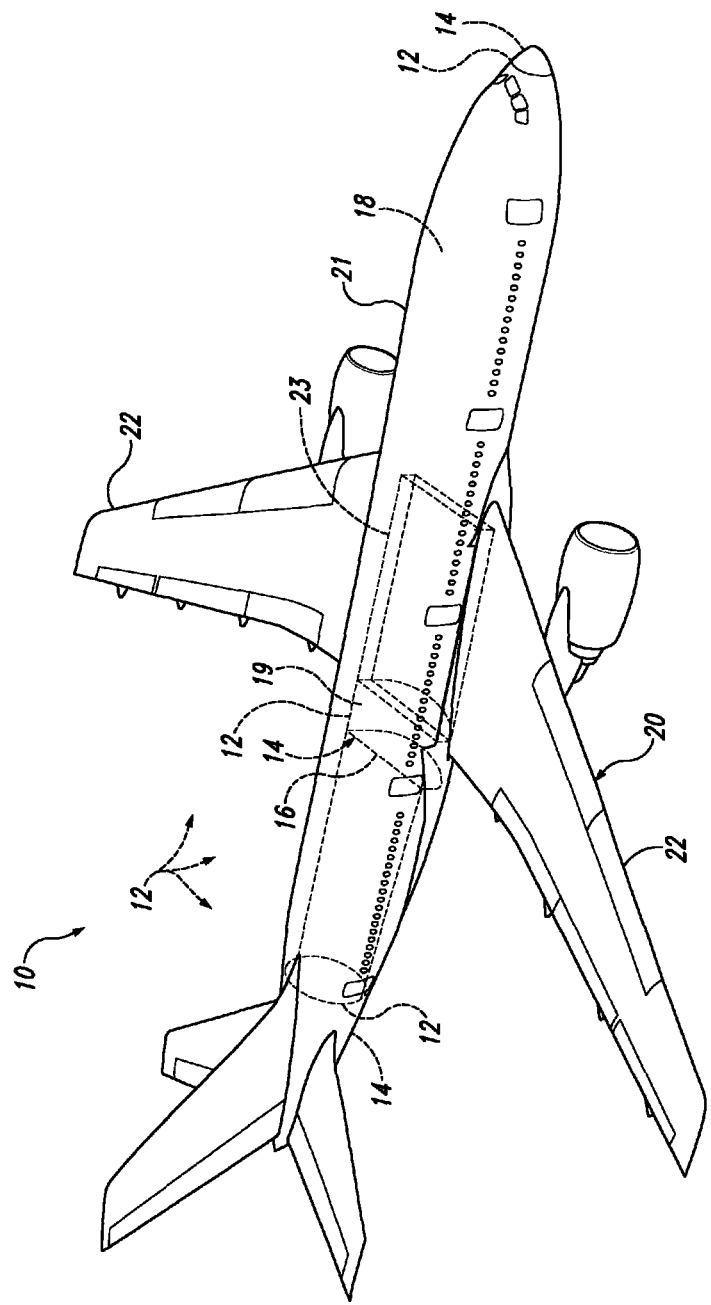
FIG. 1 is a perspective view of an aircraft.

The present disclosure relates to pressure panels, such as used in (but not limited to) aerospace applications. FIG. 1 schematically presents a commercial fixed-wing aircraft 10, as an illustrative, non-exclusive example of an aerospace application that may utilize pressure panels according to the present disclosure. However, other aerospace applications are within the scope of the present disclosure, including (but not limited to) military aircraft, rotorcraft, and space vehicles. Moreover, pressure panels according to the present disclosure also may be used in non-aerospace applications to define pressure barriers, for example, including (but not limited to) marine applications, such as in submarines.

Aircraft 10 may include one or more pressurized compartments 18 for such purposes as comfort of operators and passengers, and for protection of cargo and equipment. Aircraft 10 typically include pressure panels 12 to isolate and maintain the integrity of pressurized compartments 18 within the aircraft 10. The pressure panels 12 are subject to the pressure differential of the pressurized compartment 18 relative to neighboring compartments and/or ambient conditions. Further, pressure panels 12 may be subject to loads and/or deformation transmitted by other components of the vehicle. Such loads and/or deformation may have their ultimate source in the weight of the vehicle and the lift of the vehicle.

Aircraft 10 that include pressurized compartments 18 may also include unpressurized compartments, such as mechanical compartments 14 for equipment that requires no pressurization. Pressure panels 12 may be used to separate pressurized and unpressurized compartments. One type of unpressurized compartment is a wheel well 16. On some aircraft 10, the wheel well 16 is located near where the wing 20 meets the fuselage 21. The wheel well 16 may be adjacent or under the fuselage 21 and/or may be defined by the fuselage 21, and may be under or aft the wing 20. Other configurations also are within the scope of aircraft 10 according to the present disclosure.

Additionally or alternatively, in some aircraft 10, compartments may not be actively pressurized by a pressurization system, yet compartment walls may still be subject to pressure differentials during flight, simply due to the change in altitude and/or forces of flight, and thus external air pressure may be greater or less than internal pressure. For example, some aircraft typically do not include active pressurization systems to maintain an elevated pressure within a compartment, e.g., a cargo compartment, yet pressure differentials, including positive and/or negative pressure differentials, may be imparted between the exterior of a compartment and the interior of a compartment during flight.

A wing 20 of an aircraft 10 typically includes a wing center section 23, which may pass through or under the fuselage 21, and two outboard wing sections 22. In flight, the wing 20 creates lift which counteracts the weight of aircraft 10. Because the lift is distributed along the outboard wing sections 22, the wing 20 is subject to stress. Stress is caused by an external force, such as lift and weight, and is a structure's resistance, or counter force that opposes deformation. All stress causes some deformation, even if miniscule. Strain is the degree of deformation under stress.

Under the stress of flight, the wing 20 bends, subjecting the upper portion to compression and the lower portion to tension. Components closely coupled to the wing are thus deformed under the displacement imposed by the wing during flight. For example, where the wheel well 16 is adjacent the wing 20, a portion of the wheel well 16 may be compressed with the upper portion of the wing 20. When pressure panels 12 are used to form a portion of such a wheel well 16, the pressure panels 12 may be subject to the displacement of the wing 20, and thus subject to compression as well as the pressure differential between the wheel well 16 and the pressurized compartment 18.

Figure 2:
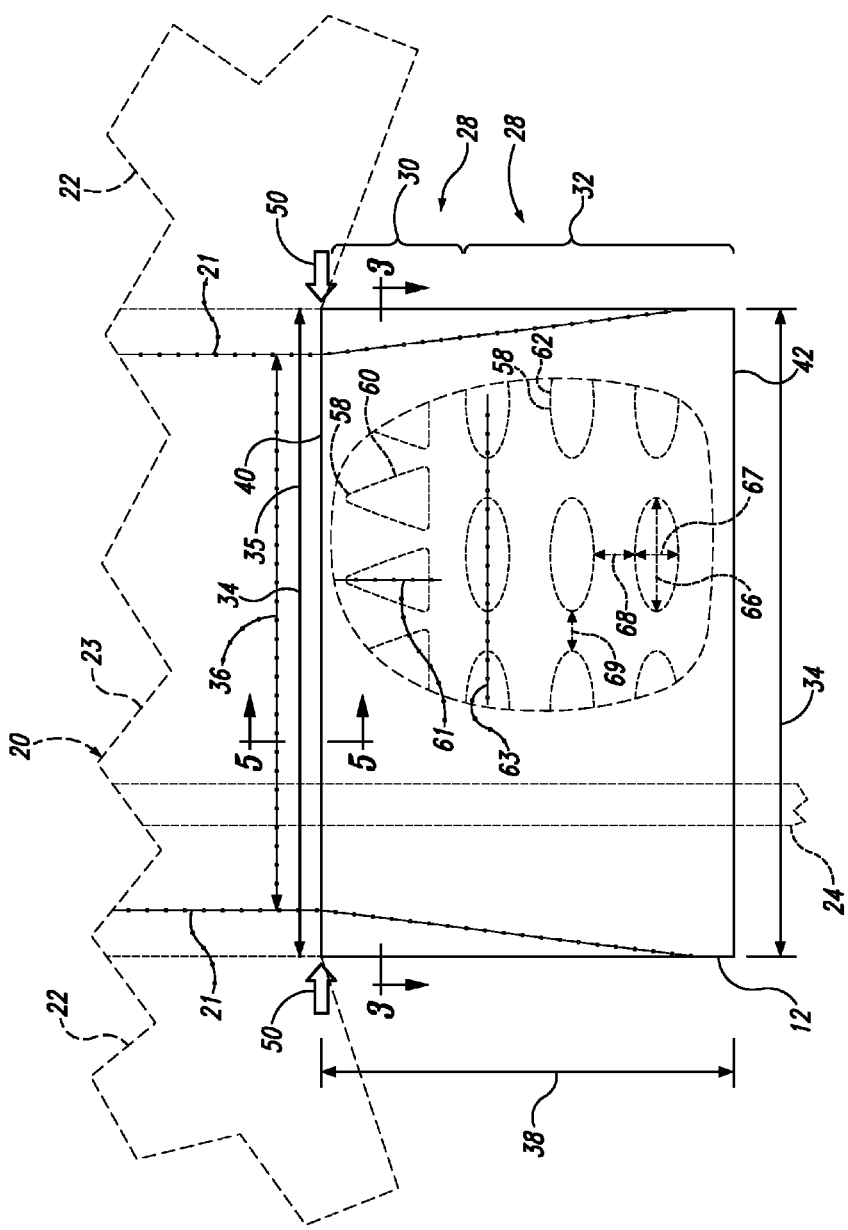
FIG. 2 is a schematic plan view representing pressure panels according to the present disclosure, also illustrated optionally as an aircraft wheel well pressure barrier directly aft of a wing center section.

FIG. 2 presents a pressure panel 12 which optionally spans the fuselage 21 of an aircraft 10. Pressure panels 12 may be generally planar or smoothly contoured, sheet-like structures (sometimes referred to as webs). Pressure panel 12, as illustrated in FIG. 2, is generally rectangular with a panel width 34 that spans the fuselage 21. Pressure panels 12 are not limited to rectangular forms and the panel width 34 does not need to span the fuselage 21 or an entire pressurized compartment 18. Several pressure panels 12 of various configurations may cooperate to form all or part of a pressure barrier 19. Individual pressure panels 12 may be configured to be joined or operatively coupled (e.g., fastened, bonded, etc.) to other pressure panels 12 of a pressure barrier 19. In the example depicted in FIG. 2, the pressure panel 12 is optionally coupled to the wing center section 23 at a first edge 40 of the pressure panel 12. The pressure panel 12 may optionally be coupled to aircraft 10 via structural supports 24, such as frames, beams, and stringers.

The pressure panel 12 includes two or more structurally distinct regions 28 with different structural properties. In the first region 30, near the first edge 40, the pressure panel 12 is relatively yielding to deformation along a designated direction. In the second region 32, optionally near a second edge 42 opposite the first edge 40, the pressure panel is relatively resistant to deformation along the designated direction. The designated direction is typically substantially parallel to the panel width 34 and/or substantially parallel to the first edge 40.

The anisotropic structural properties of the pressure panel 12 may be useful when the pressure panel 12 is connected in one location, near the first region 30, to a structure that is displaced during flight, such as a wing, and connected in a second location, near the second region 32, to a structure that is not displaced, or that is displaced to a lesser degree, during flight. Thus, the pressure panel 12 may deform in regions where necessary to comply with locally adjacent displacements, and the pressure panel may not be required to deform in other regions where adjacent structures do not undergo displacement. Additionally or alternatively, the anisotropic structural properties may be useful as part of the overall design of the frame of the aerospace vehicle.

For example, where the pressure panel 12 is coupled to the wing 20, e.g., the wing center section 23, along the first edge 40, the first region 30 will be subject to displacement by the wing during flight, as schematically illustrated at 50 in FIG. 2. In this case, the compliance of the first region 30 along the first edge 40 may be chosen to avoid reacting against significant stresses imparted from the wing 20. The second region 32, with less compliance (more stiffness), may be used to react shear due to stress on the first region 30, as well as to withstand the pressure differential across the pressure panel.

When the first region 30 is deformed in use, such as during the stress of flight, it may reduce in width by about 7%, 6%, 5%, 4%, 3%, 2%, 1%, 0.7%, 0.5%, 0.4%, 0.3%, 0.2%, or 0.1%; or about 0.1-7%, 0.1-5%, 0.1-1%, or 0.2-1%. Additionally or alternatively, deformation of the first region 30 in use may result in a panel width 34 reduction of about 100 mm, 70 mm, 50 mm, 40 mm, 30 mm, 20 mm, 10 mm, 7 mm, or 5 mm; or about 5-100 mm, 5-50 mm, or 5-30 mm.

In some embodiments, each of the structurally distinct regions 28 of the pressure panel 12 substantially spans the panel width 34. Generally, the regions are located at different positions along the panel length 38. The first region 30 may span less than 10%, less than 20%, less than 30%, less than 40%, less than 50%, less than 60%, less than 70%, less than 80%, less than 90%, 10-90%, 10-70%, 10-50%, 10-30%, 30-90%, 30-70%, 30-50%, 50-90%, 50-70%, or 70-90% of the panel length 38. The second region 32 may span the balance of the panel length 38. When three or more structurally distinct regions are present, the second region spans less than the balance of the panel length 38.

The first region 30 is relatively yielding to deformation at least along a designated direction in the contour of the pressure panel 12 (in the local plane of the pressure panel 12). The first region 30 may be relatively equally responsive to deformation in all directions in the plane of the pressure panel 12.

Alternatively, the first region 30 may respond differently to deformations in different directions, resulting in different strains.

In some embodiments, the second region 32 is relatively resistant to deformation at least along the designated direction. As with the first region 30, the second region 32 may be relatively equally responsive to deformation in all directions in the plane of the pressure panel 12, or the second region may respond differently to deformations in different directions. In some embodiments, pressure panel 12 may be subject to a load, stress and/or deformation that may be compressive or tensile.

The different structural properties of the structurally distinct regions 28 may be due to differences in materials and/or differences in the structure of the structurally distinct regions 28. Structural differences such as thickness, surface features, embedded features, and orientation may impact the compliance of a structurally distinct region 28. For example, fiber orientation in a fiber-matrix composite affects directional compliance. Integral structural features such as ridges, dimples, and other sorts of beads may also affect directional compliance. Where the difference in structural properties is dependent at least in part on orientation, the first region 30 and the second region 32 may be composed of substantially the same material oriented in different directions, optionally in perpendicular directions.

Figure 3:
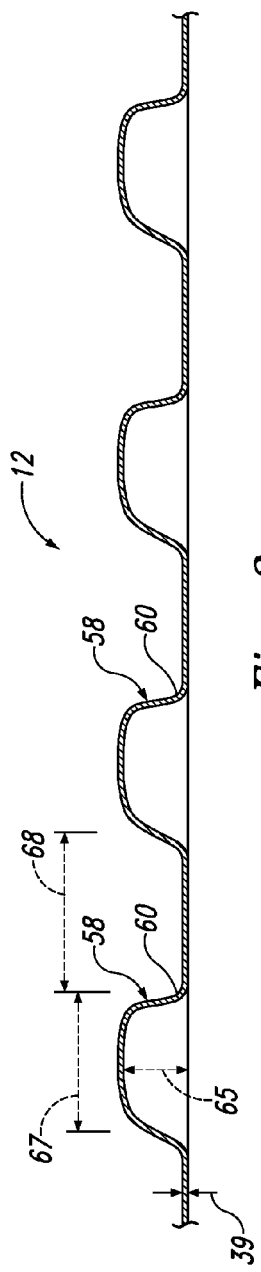
FIG. 3 is a schematic fragmentary, cross-sectional view, generally corresponding to line 3-3 in FIG. 2, representing a first region of a pressure panel according to the present disclosure in an unloaded configuration.

To maintain a pressure differential, pressure panel 12 is essentially non-porous and strong enough to withstand the pressure differential across the panel thickness 39 (FIG. 3). A pressurized compartment 18 may incorporate several pressure panels 12, each one being assembled in a manner that prevents significant leakage of atmosphere. Often, for example in commercial aircraft, a pressurized compartment 18 is held a pressure similar to atmosphere near the earth surface, about 70-100 kPa. Hence pressure panels 12 may be designed to withstand differential pressures of about 170 kPa (25 psi), 140 kPa (20 psi), 120 kPa (17 psi), 100 kPa (15 psi), 90 kPa (13 psi), 80 kPa (12 psi), 70 kPa (10 psi), 60 kPa (9 psi), 50 kPa (7 psi), 40 kPa (6 psi), or 35 kPa (5 psi); or about 40-120 kPa, 40-100 kPa, or 40-80 kPa. However, it also is within the scope of the present disclosure that pressure panels may be designed to only withstand differential pressures of less than 35 kPa (5 psi), including differential pressures in the range of only about 3.5-35 kPa (0.5-5 psi). Such pressure panels may be particularly useful in small aircraft, such as small aircraft that do not include active pressurization systems, yet still experience differential pressures across compartment walls during flight.

Pressure panels 12 are relatively thin and sheet-like. The panel thickness 39 is generally a small fraction of the panel width 34 and panel length 38. For example, the panel thickness 39 may be about 1%, about 0.5%, about 0.2%, about 0.1%, or less than 0.1% of the panel width 34 or the panel length 38. Alternatively or additionally, the panel thickness 39 may be about 0.4 mm, 0.6 mm, 0.8 mm, 1.0 mm, 1.5 mm, 2 mm, 3 mm, 4 mm, 5 mm, 6 mm, 7 mm, 8 mm, or 10 mm; or about 0.440 mm, 0.4-6 mm, 0.4-3 mm, 0.8-8 mm, or 0.8-4 mm.

Suitable materials to form the pressure panel 12, and thus the first region 30 and the second region 32, include metals, polymers, and composites. In particular, metals include aluminum alloys, magnesium alloys, and titanium alloys. Composites include fiber-matrix composites constructed with carbon, glass, polymeric and/or aramid fiber, and wherein the fibers are uniaxial, biaxial, felted, woven, and/or braided.

Pressure panels 12 may be fabricated using techniques such stamping, forming, laying-up, extruding, molding, cutting, bending and etching. Some materials are amenable to subtractive manufacturing techniques, such as machining. Some materials are amenable to additive manufacturing techniques, such as 3D printing.

FIGS. 2-3 illustrate optional beads, or features, 58 that may be in the first region 30 and/or the second region 32. First region beads 60 may be used to impart a relatively higher compliance to the first region 30. Second region beads 62 may be used to impart a relatively lower compliance to the second region 32. Beads 58 are generally structures in a panel that form concavities on one side of the panel and form bulges on the other side. The concavities of beads 58 may all be on the same side of pressure panel 12, as illustrated in FIG. 3, or some concavities may be on different sides of the pressure panel 12. In some embodiments, the thickness of the panel material generally remains approximately constant across a bead 58. Additionally or alternatively, the thickness of the panel material may be thinner in regions associated with the bead, such as a result of the bead forming process, depending on the process employed. Beads 58 may be arranged in an array, approximately periodically, and/or approximately quasi-periodically. When the pressure panel 12 is coupled to structural supports 24, the structural supports 24 may extend between adjacent beads 58, optionally on the side of the pressure panel 12 where the beads 58 bulge.

Beads 58 may have a circular profile, or may be elongated, optionally including bilateral and multilateral symmetries. In particular, beads 58 which are elongated in a direction may be said to be orientated in that direction. For example, first region beads 60 may each independently possess a longitudinal axis 61. The orientation of the group of first region beads 30 is defined by the average direction of the longitudinal axes 61. Likewise, second region beads 62 may each independently possess a longitudinal axis 63. The orientation of the group of second region beads 32 is defined by the average direction of the longitudinal axes 63. In some embodiments, all beads 58 in a structurally distinct region 28 have approximately the same shape and/or orientation. In some embodiments, a structurally distinct region 28 may incorporate beads 58 with different shapes and/or orientations.

In some embodiments, beads 58 may have an oblong profile, optionally a rectangular profile, and may include one or more flared ends (as observed in plan view). When a bead 58 has an oblong central region and two flared ends, the bead 58 has a profile resembling a bow tie shape. When a bead 58 has an elongated profile such as an oblong profile, the bead depth 65 may be generally uniform. When a bead 58 has one or more flared ends, the ends may have a generally round shape or a generally trapezoidal shape (as observed in plan view). Additionally or alternatively, a flared end may have a varying depth, for example with the depth ramping to the depth of the central region, and for example with a maximum depth less than or equal to the depth of the central region.

Bead depth 65, bead length 66, bead width 67, lateral bead spacing 68, and longitudinal bead spacing 69 all may affect the compliance of a structurally distinct region 28. Where beads 58 are elongated, bead length 66 is longer than bead width 67. Bead length 66 may be greater than 100 mm, 200 mm, 300 mm, 400 mm, 500 mm, 600 mm, 700 mm, 800 mm, 900 mm, or 1000 mm; or about 100-1000 mm, 200-800 mm, or 200-600 mm. Bead width 67 may be about 5%, 10%, 20%, 30%, 40%, 50%, 60%, 70%, 80%, 90%, or 100% of bead length 66, optionally about 5-100%, 10-80%, 10-50%, or 5-30% of bead length 66. Bead depth 65 may be about 10%, 20%, 30%, 40%, 50%, 60%, 70%, 80%, 90%, 100%, 120%, 150%, or 200% of bead width 67, optionally about 10-200%, 20-120%, 20-80%, or 20-50% of bead width 67. Bead depth

65 may be about 2 mm, 5 mm, 10 mm, 15 mm, 20 mm, 25 mm, 30 mm, 40 mm, 50 mm, 60 mm, 70 mm, 80 mm, 90 mm, or 100 mm; or about 2400 mm, 5-60 mm, or 20-60 mm. Bead lateral spacing 68 may be about 50%, 80%, 100%, 120%, 150%, 200%, 250%, 300%, 400%, or 500% of bead width 67, optionally about 50-500%, 50-300%, 80-200%, or 80-150% of bead width 67. Bead longitudinal spacing 69 may be about 5%, 10%, 20%, 30%, 40%, 50%, 60%, 70%, 80%, 90%, 100%, 120%, 150%, or 200% of the bead length 66, optionally about 5-200%, 5-120%, 10-80%, or 70-150%.

In an unloaded configuration (not subject to significant lateral deformation), the first region 30 has an unloaded first region width 35 (the width of the first region 30 nearest the first edge 40). In a loaded configuration (subject to significant lateral deformation), the first region 30 has a loaded first region width 36 (the width of the first region 30 nearest the first edge 40) which is different than the unloaded first region width 35. For example, under compressive deformation, the loaded first region width 36 is less than the unloaded region width 35. Where the perimeter of the pressure panel 12 is generally rectangular in an unloaded configuration, a loaded configuration may result in a generally trapezoidal perimeter of the pressure panel 12.

Figure 4:
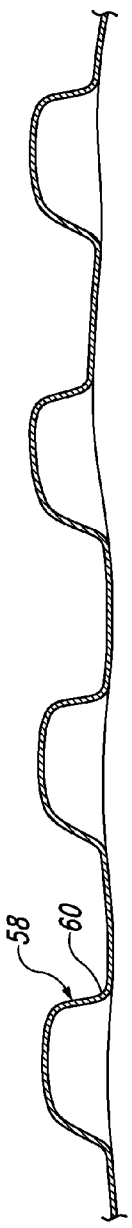
FIG. 4 is a schematic fragmentary, cross-sectional view, generally corresponding to line 3-3 in FIG. 2, representing a first region of a pressure panel according to the present disclosure in a loaded configuration.

Under lateral deformation, the first region 30 of pressure panel 12 may change width without substantially deforming the contour of the pressure panel 12, or the panel may change width along the contour by flexing out of the local plane of the contour. FIG. 3 depicts a fragmentary cross section of a first region 30, with optional first region beads 60, in an unloaded configuration, with the first region 30 forming a linear profile. FIG. 4, on the other hand, depicts a fragmentary cross section of the first region 30, with optional first region beads 60, in a potential loaded configuration. In the example of FIG. 4, the first region 30 is subjected to lateral compression, and the first region 30 is flexed out of the local plane of the contour of the pressure panel 12, resulting in a generally buckled, or sinusoidal, profile. When optional first region beads 60 are present, lateral deformation may cause one or more of the first region beads 60 to flex, e.g., bend, bow, and/or buckle. When one or more of the first region beads 60 do flex under compression, the first region 30 may change width in an accordion-like fashion.

Figure 5:
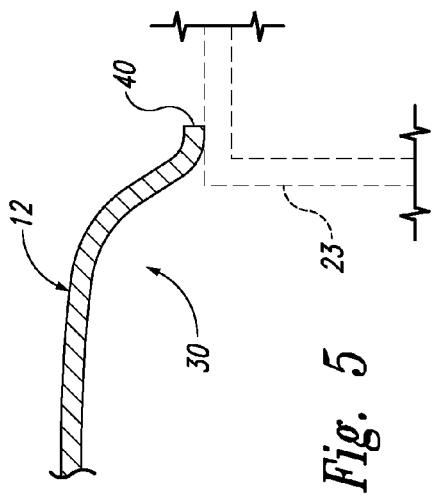
FIG. 5 is a schematic fragmentary, cross-sectional view of a pressure panel and optional wing center section, generally corresponding to line 5-5 in FIG. 2.
Figures 6, 8:
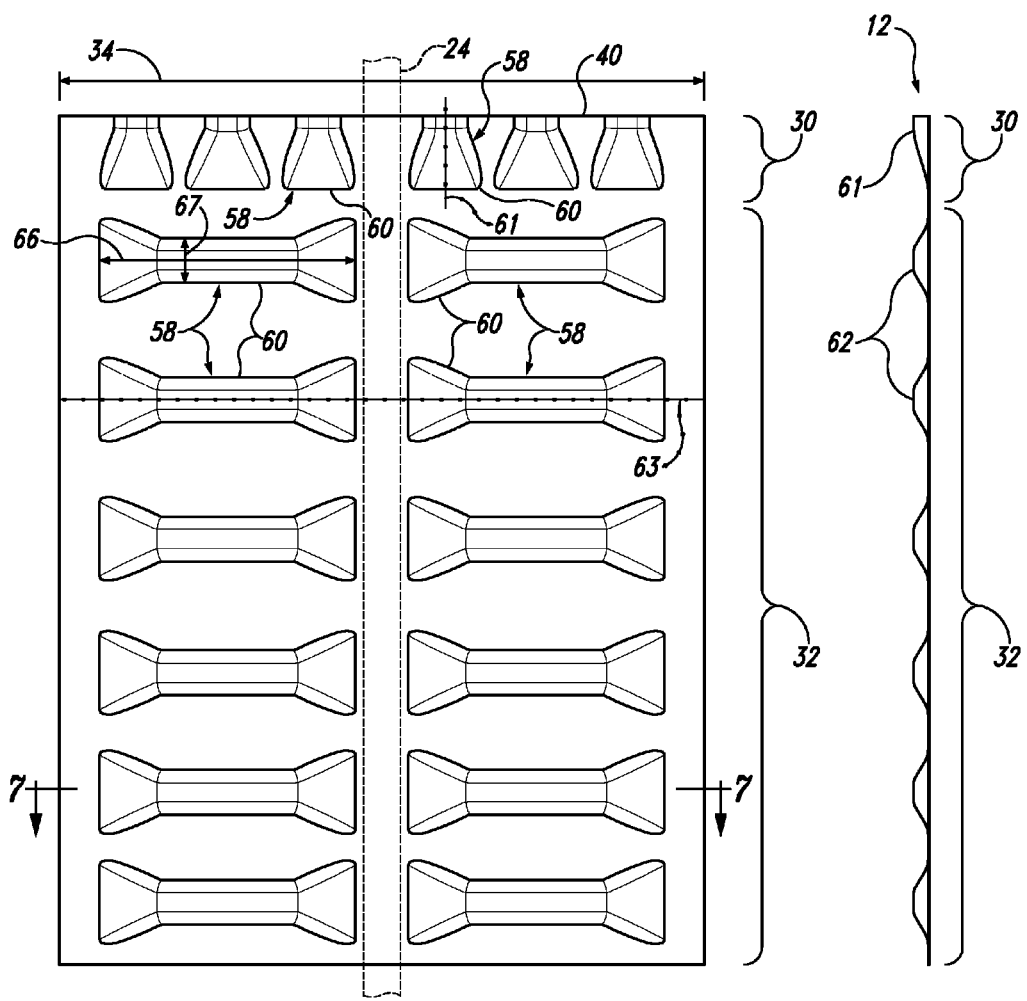
FIG. 6 is a plan view of an illustrative, non-exclusive example of a pressure panel according to the present disclosure.
FIG. 8 is a side view of the pressure panel of FIG. 6.
Figure 7:
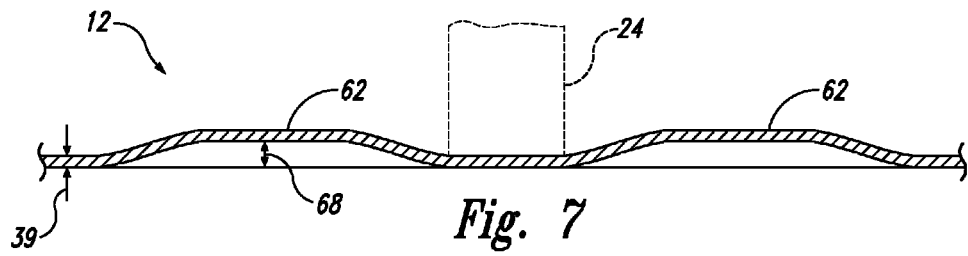
FIG. 7 is cross-sectional view of the pressure panel of FIG. 6, generally corresponding to line 7-7.
Figure 9:
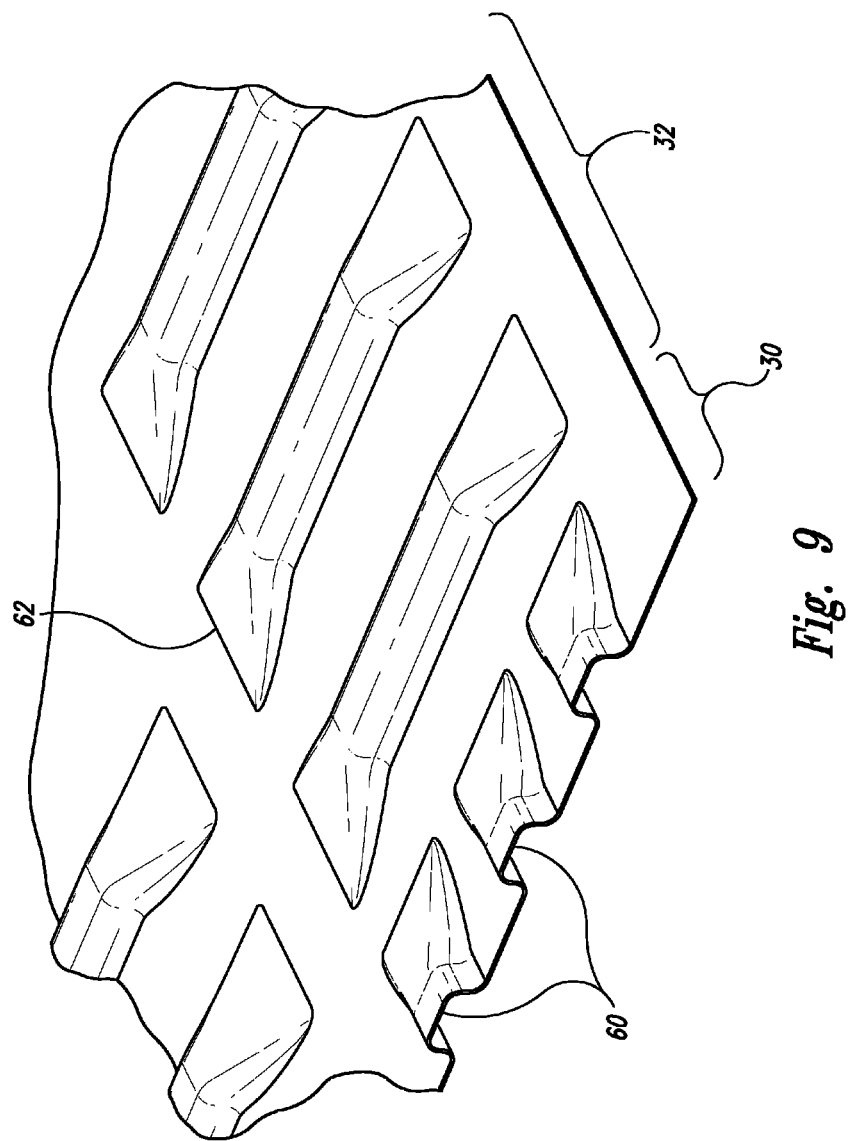
FIG. 9 is a fragmentary isometric view of the pressure panel of FIG. 6.

In an unloaded configuration, the pressure panel 12 generally defines a smooth contour, such as a plane. In some embodiments, as for example depicted in FIG. 5, the pressure panel 12 may include a bend or curved region which directs the first region 30 out of the local plane of the contour of the pressure panel 12. When the pressure panel includes such a bend or curved region, at least a portion of the first region 30 is directed about 30°, 60°, 90°, 120°, or 150° (optionally about 30-150°, 60-120°, 80-100°) away from the general contour of the pressure panel 12. In these embodiments, the profile of the pressure panel 12 defines a V- or L-shape. Such profiles may be useful to form the corner of a pressurized compartment 18 with the pressure panel.

Turning now to FIGS. 6-10, illustrative non-exclusive examples of pressure panels 12 and aircraft 10 are illustrated. Where appropriate, the reference numerals from the schematic illustrations of FIGS. 1-5 are used to designate corresponding parts of pressure panels 12 and aircraft 10; however, the examples of FIGS. 6-10 are non-exclusive and do not limit pressure panels 12 and aircraft 10 to the illustrated embodiments of FIGS. 6-10. That is, pressure panels 12 and aircraft 10 are not limited to the specific embodiments illustrated in FIGS. 6-10, and pressure panels and aircraft may incorporate any number of the various aspects, configurations, characteristics, properties, etc. that are illustrated in and discussed with reference to the schematic representations of FIGS. 1-5 and/or the embodiments of FIGS. 6-10, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 6-10; however, it is within the scope of the present disclosure that the previously discussed features, variants, etc. may be utilized with the illustrated embodiments of FIGS. 6-10.

In FIGS. 6-9, pressure panel 12 includes a first region 30 with a plurality of first region beads 60 and a second region 32 with a plurality of second region beads 62. The first region beads 60 are generally arranged in a single row along the first edge 40. The first region beads 60 have a generally rectangular end that extends to the first edge 40 and a flared, generally trapezoidal, end that extends towards the second region 32. The rectangular end has a generally uniform depth. The flared end has a depth that ramps towards the rectangular end. The second region beads 62 are generally arranged in an array. The second region beads 62 have a generally rectangular central region and two flared, generally trapezoidal, ends. The central region has a generally uniform depth. The flared ends have a depth that ramps towards the central region. The first region 30 and the second region 32 leave a sufficient space to couple a structural support 24 to the pressure panel 12 such that the structural support 24 may be situated between adjacent beads 58.

Figure 10:
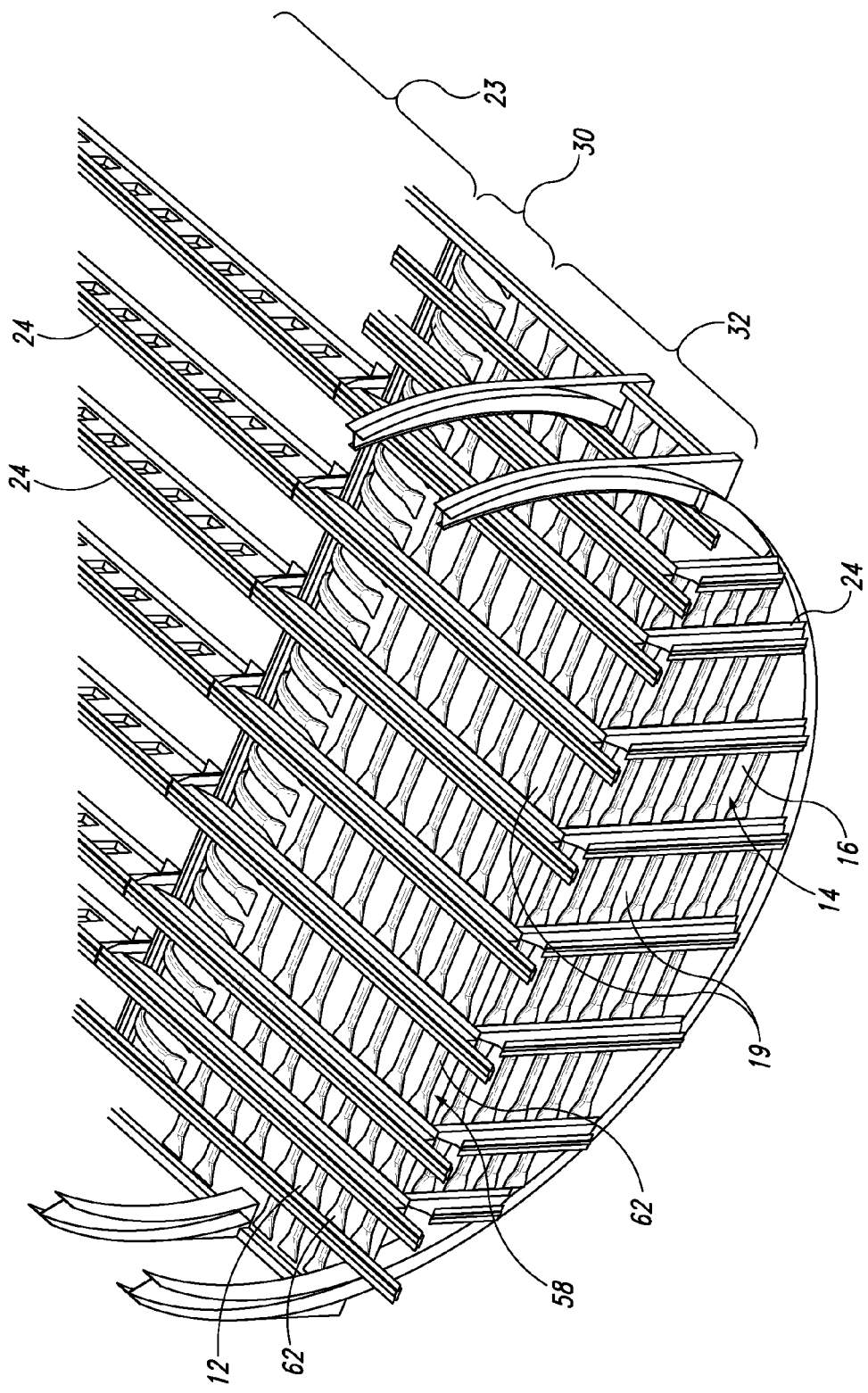
FIG. 10 is a fragmentary isometric view of a portion of an aircraft, including a wheel well defined by a plurality of illustrative non-exclusive examples of pressure panels according to the present disclosure, with the wheel well directly aft of the aircraft's wing center section.

In FIG. 10, pressure panel 12 includes a first region 30 with a plurality of first region beads 60, a second region 32 with a plurality of second region beads 62, and a bend along the first region 30 that curves the first region across the first region beads 60. The pressure panel 12 forms a horizontal pressure deck of a wheel well 16. Also shown is a vertical bulkhead that partially encloses the wheel well. The vertical bulkhead may incorporate a second pressure panel 12. The second region beads 62 are generally arranged in an array incorporating beads 58 of different dimensions. The pressure panel 12 is coupled to the wing center section 23 along the first region near the bend. The pressure panel 12 is coupled to several structural supports 24 (beams) between adjacent beads 58.

Illustrative, non-exclusive examples of inventive subject matter according to the present disclosure are described in the following enumerated paragraphs:

A1. A pressure panel, comprising:
  a body having a width defining a lateral direction, a length defining a longitudinal direction, and a thickness that is substantially less than the width and the length;
  wherein the body has a first region that substantially spans the width of the body, and a second region that substantially spans the width of the body; and
  wherein the first region yields to lateral deformation more than the second region.

A2. The pressure panel of paragraph A1, wherein the first region yields to lateral compression more than the second region.

A3. The pressure panel of any of paragraphs A1-A2, wherein the second region resists lateral deformation more than the first region.

A4. The pressure panel of any of paragraphs A1-A3, wherein the second region resists lateral compression more than the first region.

A5. The pressure panel of any of paragraphs A1-A4, wherein the second region is adjacent to the first region.

A6. The pressure panel of any of paragraphs A1-A5, wherein the first region is along a first edge of the body, optionally wherein the second region is along a second edge, and optionally wherein the second edge is opposite the first edge.

A7. The pressure panel of any of paragraphs A1-A6, wherein the first region resists longitudinal deformation more than the second region.

A8. The pressure panel of any of paragraphs A1-A7, wherein the second region yields to longitudinal deformation more than the first region.

A9. The pressure panel of any of paragraphs A1-A8, wherein the first region resists longitudinal deformation more than lateral deformation.

A10. The pressure panel of any of paragraphs A1-A9, wherein the second region resists lateral deformation more than longitudinal deformation.

A11. The pressure panel of any of paragraphs A1-A10, wherein the first region spans less than 10%, less than 20%, less than 30%, less than 40%, less than 50%, less than 60%, less than 70%, less than 80%, less than 90%, 10-90%, 10-70%, 10-50%, 10-30%, 30-90%, 30-70%, 30-50%, 50-90%, 50-70%, or 70-90% of the length of the body.

A12. The pressure panel of any of paragraphs A1-A11, wherein the body is configured to withstand a pressure differential across the thickness of the body of at least 3.5 kPa (0.5 psi), at least 35 kPa (5 psi), at least 40 kPa (6 psi), at least 50 kPa (7 psi), at least 60 kPa (9 psi), at least 70 kPa (10 psi), at least 80 kPa (12 psi), at least 90 kPa (13 psi), at least 100 kPa (14 psi), at least 120 kPa (17 psi), at least 140 kPa (20 psi), or at least 170 kPa (25 psi), optionally without significant damage to the body.

A13. The pressure panel of any of paragraphs A1-A12, wherein the thickness is constant, and optionally substantially constant, and optionally generally constant, across an entirety of the body.

A14. The pressure panel of any of paragraphs A1-A13, wherein the body has a perimeter that is rectangular, optionally substantially rectangular, and optionally generally rectangular.

A15. The pressure panel of any of paragraphs A1-A14, wherein the body has an unloaded configuration, in which the first region is not subjected to significant lateral deformation, and a loaded configuration, in which the first region is subjected to significant lateral deformation.

A15.1. The pressure panel of paragraph A15, wherein, in the loaded configuration, the first region is subjected to significant lateral compression.

A15.2. The pressure panel of any of paragraphs A15-A15.1, wherein, in the unloaded configuration, the body has an unloaded perimeter that is rectangular, optionally substantially rectangular, and optionally generally rectangular; and wherein, in the loaded configuration, the body has a loaded perimeter that is trapezoidal, optionally substantially trapezoidal, and optionally generally trapezoidal.

A15.3. The pressure panel of any of paragraphs A15-A15.2, wherein, in the unloaded configuration, the first region has a first region unloaded width and the second region has a width substantially equal to the first region unloaded width; and wherein, in the loaded configuration, the first region has a first region loaded width and the second region has a width significantly different from the first region loaded width.

A15.4. The pressure panel of any of paragraphs A15-A15.3, wherein, in the loaded configuration, the first region is buckled due to the significant lateral stress.

A16. The pressure panel of any of paragraphs A1-A15.4, wherein the first region yields to lateral deformation more than the second region due to structural differences between the first region and the second region.

A17. The pressure panel of any of paragraphs A1-A16, wherein the first region yields to lateral deformation more than the second region due to geometric differences between the first region and the second region.

A18. The pressure panel of any of paragraphs A1-A17, wherein the first region yields to lateral deformation more than the second region not due to differences in materials from which the first region and the second region are constructed.

A19. The pressure panel of any of paragraphs A1-A18, wherein the body generally defines a plane except for a lateral bend that directs at least a portion of the first region out of the plane.

A19.1. The pressure panel of paragraph A19, wherein the bend directs at least a portion of the first region out of the plane about 30°, about 60°, about 90°, about 120°, or about 150°; optionally about 30-150°, 60-120°, 80-100°.

A20. The pressure panel of any of paragraphs A1-A19.1, wherein the second region defines a local plane and wherein the first region is curved out of the local plane.

A20.1. The pressure panel of paragraph A20, wherein the first region is curved out of the local plane about 30°, about 60°, about 90°, about 120°, or about 150°; optionally about 30-150°, 60-120°, 80-100°.

A21. The pressure panel of any of paragraphs A1-A20.1, wherein the body defines a first plurality of beads within the first region, optionally wherein the first plurality of beads includes elongated beads.

A21.1. The pressure panel of paragraph A21, wherein the first plurality of beads is oriented longitudinally.

A21.2. The pressure panel of any of paragraphs A21-A21.1, wherein the first plurality of beads consists of a single row of beads.

A21.3. The pressure panel of any of paragraphs A21-A21.2, wherein the first plurality of beads includes two or more rows of beads.

A21.4. The pressure panel of any of paragraphs A21-A21.4, wherein at least one bead of the first plurality of beads has a central region and at least one flared end region.

A21.4.1. The pressure panel of paragraph A21.4, wherein in plan view, the at least one flared end region has a generally round shape, or a generally trapezoidal shape.

A21.4.2. The pressure panel of any of paragraphs A21.4-A21.4.1, wherein in plan view, the central region has an oblong shape, optionally a rectangular shape.

A21.4.3. The pressure panel of any of paragraphs A21.4-A21.4.2, wherein the central region has a generally uniform depth.

A21.4.4. The pressure panel of any of paragraphs A21.4-A21.4.3, wherein the at least one flared end region is ramped to the depth of the central region.

A21.4.5. The pressure panel of any of paragraphs A21.4-A21.4.4, wherein the at least one flared end region varies in depth, with a maximum depth less than or equal to the central region.

A21.5. The pressure panel of any of paragraphs A21-A21.4.5 when also depending from any of paragraphs A19-A20.1, wherein at least a portion of the first plurality of beads is out of the plane or local plane, optionally wherein at least one of the beads of the first plurality of beads is bent and/or curved out of the plane or local pane.

A22. The pressure panel of any of paragraphs A1-A21.5, wherein the body defines a second plurality of beads within the second region, optionally wherein the second plurality of beads includes elongated beads.

A22.1. The pressure panel of paragraph A22, wherein the second plurality of beads is oriented laterally.

A22.2. The pressure panel of any of paragraphs A22-A22.1, wherein the second plurality of beads includes two or more rows of beads.

A22.3. The pressure panel of any of paragraphs A22-A22.2 when also depending from any of paragraphs A21-A21.5, wherein the first plurality of beads is oriented differently than the second plurality of beads.

A22.3.1. The pressure panel of paragraph A22.3, wherein the first plurality of beads is oriented obliquely, substantially perpendicularly, or perpendicularly to the second plurality of beads.

A22.4. The pressure panel of any of paragraphs A22-A22.3.1, wherein at least one bead of the second plurality of beads has a central region and at least one flared end region.

A22.4.1. The pressure panel of paragraph A22.4, wherein in plan view, the at least one flared end region has a generally round shape, or a generally trapezoidal shape.

A22.4.2. The pressure panel of any of paragraphs A22.4-A22.4.1, wherein in plan view, the central region has an oblong shape, optionally a rectangular shape.

A22.4.3. The pressure panel of any of paragraphs A22.4-A22.4.2, wherein the central region has a generally uniform depth.

A22.4.4. The pressure panel of any of paragraphs A22.4-A22.4.3, wherein the at least one flared end region is ramped to the depth of the central region.

A22.4.5. The pressure panel of any of paragraphs A22.4-A22.4.4, wherein the at least one flared end region varies in depth, with a maximum depth less than or equal to the central region.

A23. The pressure panel of any of paragraphs A1-A22.4.5, wherein the body is a monolithic body.

A24. The pressure panel of any of paragraphs A1-A23 when depending from any of paragraphs A21-A21.5, wherein at least one bead, optionally all beads, of the first plurality of beads is integrally formed of the body.

A25. The pressure panel of any of paragraphs A1-A24 when depending from any of paragraphs A22-A22.4.5, wherein at least one bead, optionally all beads, of the second plurality of beads is integrally formed of the body.

A26. The pressure panel of any of paragraphs A1-A25, wherein the body is constructed of metal, optionally one or more of aluminum alloy, magnesium alloy, and titanium alloy.

A27. The pressure panel of any of paragraphs A1-A26, wherein the body is constructed of a composite material, and optionally a fiber reinforced composite material, optionally wherein the fiber, if present, includes at least one of glass, carbon, and aramid.

B1. An aircraft, comprising:
a fuselage with a pressurized compartment; and
at least one pressure panel of any of paragraphs A-A27 supported by the fuselage, wherein the at least one pressure panel is configured to at least partially maintain a pressure within the pressurized compartment that is greater than or less than a pressure outside of the aircraft while the aircraft is in flight.

B2. The aircraft of paragraph B1, wherein the at least one pressure panel at least partially defines a boundary between a pressurized region of the fuselage and a non-pressurized region of the fuselage.

B3. The aircraft of any of paragraphs B1-B2, further comprising:
a plurality of spaced-apart beams extending longitudinally along the fuselage and engaged with an upper surface of the at least one pressure panel.

B3.1. The aircraft of paragraph B3, when depending from any of paragraphs A21-A21.5, wherein each beam extends between adjacent beads of the first plurality of beads.

B3.2. The aircraft of any of paragraphs B3-B3.1, when depending from any of paragraphs A22-A22.4.5, wherein each beam extends between adjacent beads of the second plurality of beads.

B4. The aircraft of any of paragraphs B1-B3.2, further comprising:
a wing assembly including outboard wing sections and a wing center section between the outboard wing sections, wherein the wing assembly is supported by the fuselage;
wherein the at least one pressure panel is positioned with the first region of the body adjacent to and in mechanical communication with the wing center section, optionally wherein the at least one pressure panel is operatively attached to, and optionally directly attached to, the wing center section.

B5. The aircraft of any of paragraphs B1-B4, wherein the at least one pressure panel at least partially defines a wheel well of the aircraft.

B5.1. The aircraft of paragraph B5, wherein the wheel well is partially defined by a horizontal pressure deck that includes at least one of the at least one pressure panels.

B5.2. The aircraft of any of paragraphs B5-B5.1, wherein the wheel well is partially defined by at least one vertical bulkhead that includes at least one of the at least one pressure panels.

B6. The aircraft of any of paragraphs B1-B5.2, when depending from any of paragraphs A15-A15.5, wherein the loaded configuration corresponds to the aircraft during flight.

C1. A method of manufacturing the pressure panel of any of paragraphs A-A27, the method comprising one or more of stamping, forming, laying-up, extruding, molding, cutting, bending and etching.

C2. A method of manufacturing the pressure panel of any of paragraphs A-A27, the method comprising subtractive manufacturing techniques.

C3. A method of manufacturing the pressure panel of any of paragraphs A-A27, the method comprising additive manufacturing techniques.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft, comprising:
 a fuselage with a pressurized compartment;
 a wing assembly including outboard wing sections and a wing center section between the outboard wing sections; and
 at least one pressure panel including:
  a body having a width defining a lateral direction, a length defining a longitudinal direction, and a thickness that is substantially less than the width and the length, wherein the body is a monolithic body;
  wherein the body has a first region that substantially spans the width of the body, and a second region that substantially spans the width of the body;
  wherein the first region yields to lateral deformation more than the second region;
  wherein the body defines a first plurality of elongated beads within the first region; and
  wherein the body defines a second plurality of elongated beads within the second region;
 wherein the at least one pressure panel is supported by the fuselage and is configured to at least partially maintain a pressure within the pressurized compartment that is greater than or less than a pressure outside of the aircraft while the aircraft is in flight; and
 wherein the at least one pressure panel is positioned with the first region adjacent to and in mechanical communication with the wing center section.

2. The aircraft of claim 1, further comprising:
 a plurality of spaced-apart beams extending longitudinally along the fuselage and engaged with an upper surface of the at least one pressure panel; wherein each beam extends between adjacent elongated beads of the first plurality of elongated beads.

3. The aircraft of claim 1, wherein the at least one pressure panel at least partially defines a wheel well of the aircraft.

4. An aircraft, comprising:
 a fuselage with a pressurized compartment;
 a wing assembly including outboard wing sections and a wing center section between the outboard wing sections; and
 at least one pressure panel including:
  a body having a width defining a lateral direction, a length defining a longitudinal direction, and a thickness that is substantially less than the width and the length;
  wherein the body has a first region that substantially spans the width of the body, and a second region that substantially spans the width of the body;
  wherein the first region yields to lateral deformation more than the second region;
  wherein the body defines a first plurality of elongated beads within the first region; and
  wherein the body defines a second plurality of elongated beads within the second region;
 wherein the at least one pressure panel is supported by the fuselage and is configured to at least partially maintain a pressure within the pressurized compartment that is greater than or less than a pressure outside of the aircraft while the aircraft is in flight; and
 wherein the at least one pressure panel is positioned with the first region adjacent to and in mechanical communication with the wing center section.

5. The aircraft of claim 4, wherein the first plurality of elongated beads is oriented differently than the second plurality of elongated beads.

6. The aircraft of claim 5, wherein the first plurality of elongated beads is oriented substantially perpendicularly to the second plurality of elongated beads.

7. The aircraft of claim 4, wherein each of the first plurality of elongated beads has a central region and at least one flared end region.

8. The aircraft of claim 4, wherein each of the second plurality of elongated beads has a central region and at least one flared end region.

9. The aircraft of claim 4, wherein each of the first plurality of elongated beads is integrally formed of the body.

10. The aircraft of claim 4, wherein each of the second plurality of elongated beads is integrally formed of the body.

11. The aircraft of claim 4, wherein the body is constructed of aluminum alloy, magnesium alloy, or titanium alloy.

12. The aircraft of claim 4, wherein the body is constructed of a fiber reinforced composite material including at least one of glass, carbon, and aramid.

13. The aircraft of claim 4, wherein the first region resists longitudinal deformation more than lateral deformation.

14. The aircraft of claim 4, wherein the second region resists lateral deformation more than longitudinal deformation.

15. The aircraft of claim 4, wherein the elongated beads of the first plurality of elongated beads are oriented longitudinally, and the elongated beads of the second plurality of elongated beads are oriented laterally.

16. The aircraft of claim 4, wherein the first region of at least one pressure panel of the at least one pressure panel is along a first edge of the body; wherein the second region is along a second edge of the body opposite the first edge; wherein the second region defines a local plane; and wherein the first region is curved out of the local plane.

17. The aircraft of claim 4, wherein the first plurality of elongated beads consists of a single row of elongated beads integrally formed of the body.

18. The aircraft of claim 4, wherein the second plurality of elongated beads includes two or more rows of elongated beads integrally formed of the body.

* * * * *